(12) United States Patent
Dessiatoun et al.

(10) Patent No.: US 7,159,646 B2
(45) Date of Patent: Jan. 9, 2007

(54) ELECTROHYDRODYNAMICALLY (EHD) ENHANCED HEAT TRANSFER SYSTEM AND METHOD WITH AN ENCAPSULATED ELECTRODE

(75) Inventors: Serguei V. Dessiatoun, Colmar Manor, MD (US); Igor Ivakhnenko, Silver Spring, MD (US); Michael M. Ohadi, Clarksville, MD (US)

(73) Assignee: University of Maryland, College Park, MD (US)

( * ) Notice: Subject to any disclaimer, the term of this patent is extended or adjusted under 35 U.S.C. 154(b) by 514 days.

(21) Appl. No.: 10/413,294

(22) Filed: Apr. 15, 2003

(65) Prior Publication Data

US 2003/0203245 A1 Oct. 30, 2003

Related U.S. Application Data

(60) Provisional application No. 60/372,756, filed on Apr. 15, 2002.

(51) Int. Cl.
*F28F 27/00* (2006.01)
*H05K 7/20* (2006.01)

(52) U.S. Cl. .................................. 165/96; 165/104.23
(58) Field of Classification Search .................. 165/96, 165/104.23, 104.28, 104.33; 361/699; 429/23, 429/24, 26, 129
See application file for complete search history.

(56) References Cited

U.S. PATENT DOCUMENTS

| | | | |
|---|---|---|---|
| 3,056,587 A * | 10/1962 | Steigerwald ................. 392/324 |
| 3,344,853 A * | 10/1967 | Singer .................... 165/104.23 |
| 3,681,896 A | 8/1972 | Velkoff |
| 3,872,917 A | 3/1975 | Blomgren et al. |
| 4,056,142 A | 11/1977 | Baumann et al. |
| 4,207,942 A | 6/1980 | Cowan et al. |
| 4,396,055 A | 8/1983 | Mitchell, Jr. |
| 4,401,148 A | 8/1983 | Yabe et al. |
| 4,471,833 A | 9/1984 | Yabe et al. |
| 4,515,206 A * | 5/1985 | Carr ............................. 165/96 |
| 4,651,806 A * | 3/1987 | Allen et al. ................... 165/96 |
| 4,924,937 A * | 5/1990 | Beal et al. ..................... 165/96 |
| 5,072,780 A | 12/1991 | Yabe |
| 5,769,155 A | 6/1998 | Ohadi et al. |
| 6,374,909 B1 * | 4/2002 | Jeter et al. ..................... 165/96 |
| 6,659,172 B1 * | 12/2003 | Dewar et al. ................ 165/166 |
| 6,779,594 B1 * | 8/2004 | Judge et al. ................... 165/96 |

OTHER PUBLICATIONS

Akira Yabe et al., "Active Heat Transfer Enhancement by Utilizing Electric Fields", Annual Review of Heat Transfer, 1996, p. 193-244, Vol. 07, Begell House.

(Continued)

*Primary Examiner*—Tho Duong
(74) *Attorney, Agent, or Firm*—Rosenberg, Klein & Lee

(57) ABSTRACT

An electrohydrodynamically enhanced heat transfer system (EHD) includes an electrode completely encapsulated in an insulating material and coupled to a power supply to generate an electric field between a heat transfer surface and the encapsulated electrode when energized for interacting with the heat exchange surface and the working media to reduce frost formation on the heat transfer surface and to enhance heat transfer. The power supply may be completely encapsulated and immersed into the working media. In order to reduce accumulation of condensed liquid onto the electrode, the surface of the insulating material of the encapsulated electrode is either covered with a water repellent, or heated a few degrees above the dew point temperature of the air surrounding the heat transfer surface. The encapsulated electrode can be energized by an AC or DC electric field through a controlling switch.

25 Claims, 5 Drawing Sheets

OTHER PUBLICATIONS

John T. Bartelett et al., "The Growth of Ice Crystals in an Electric Field", Zeitschrift For Angewandte Mathematik und Physik, 1963, p. 598-611, vol. 14.

M. Arif-Uz-Zaman et al., "ANovel Dehumidification Technique Using Electric Field", IEEE Transactions on Industry Applications, Jan. 1996, p. 36-40, vol. 32, No. 1.

F.M.J. McCluskey et al., "Heat Transfer Enhancement By Electroconvection Resulting From an Injected Space Charge Between Parallel Plates", Ins. J. Heat Mass Transfer, 1991, p. 2237-2250, Vol. 34, No. 09, Great Britain.

G.J. Pietsch, "Properties of Dielectric Barrier Discharges in Different Arrangements".

Peng Zhang, "Atmospheric Pressure Dielectric Barrier Glow Discharge and its Numerical Simulation".

M. M. Ohadi, et al., "Electrode Materials Sciences, Design, Fabrication, and Materials Sciences for EHD-Enhanced Heat and Mass Transport", Annual Review of Heat Transfer, Begell House, 2001, vol. 11, pp. 563-623.

L. W. Da Silva, et al., "Electrohydrodynamic Enhancement of R-134a Condensation on Enhanced Tubes", 35th IAS Annual Meeting and World Conference on Industrial Applications of Electrical Energy, Oct. 8-12, 2000, Conference Record—IAS Annual Meeting (IEEE Industry Applications Society) Rome, Italy, vol. 2, pp. 757-764.

* cited by examiner

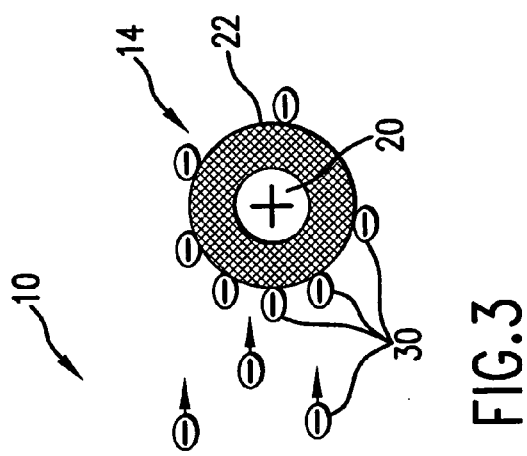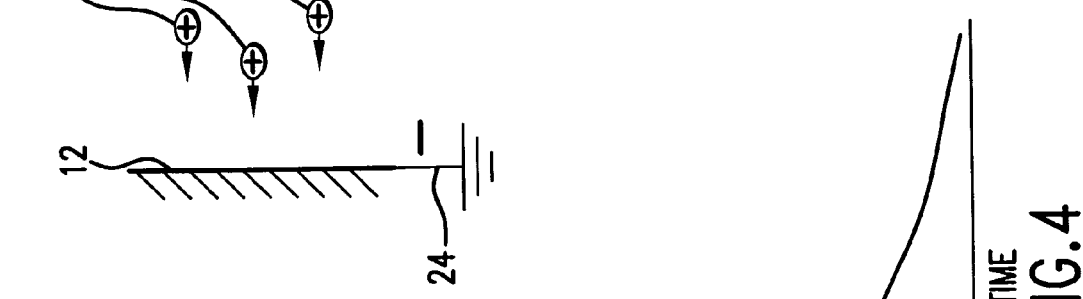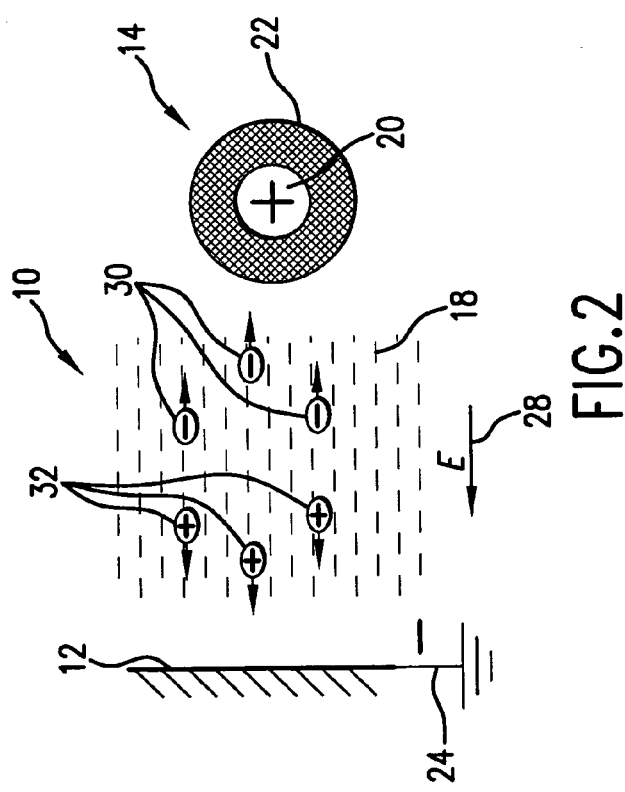

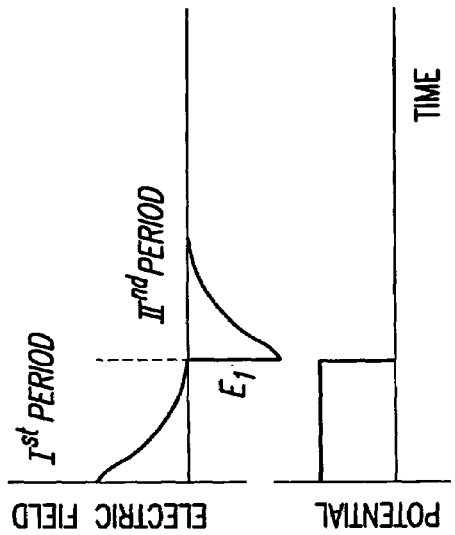
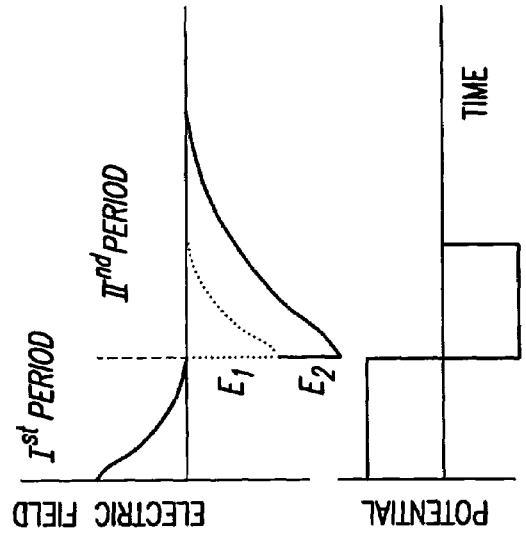
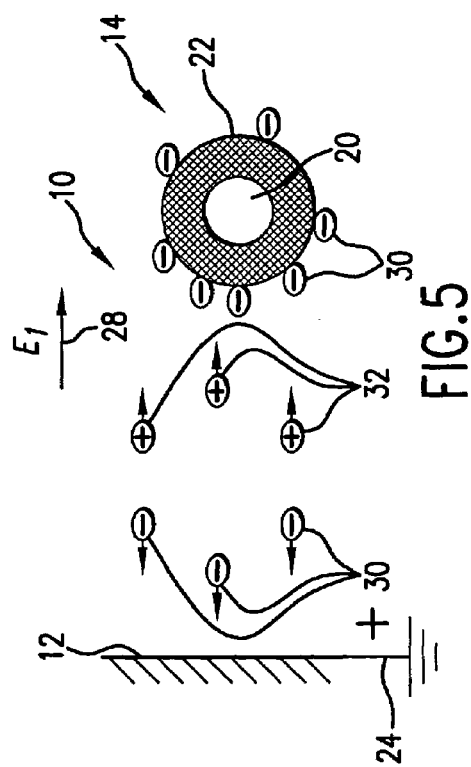
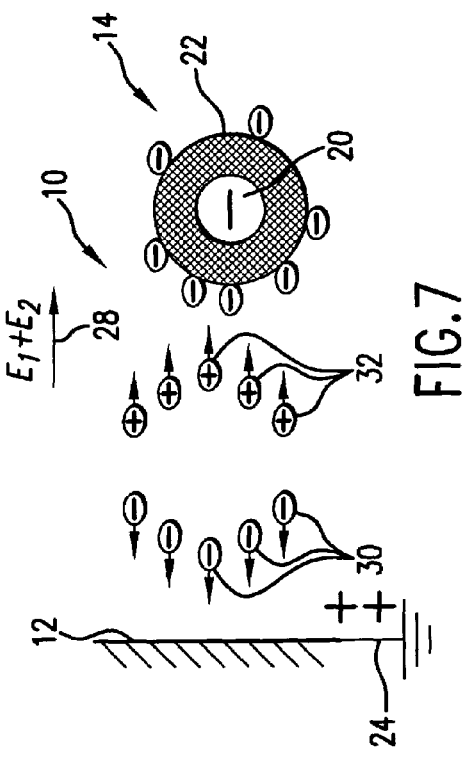

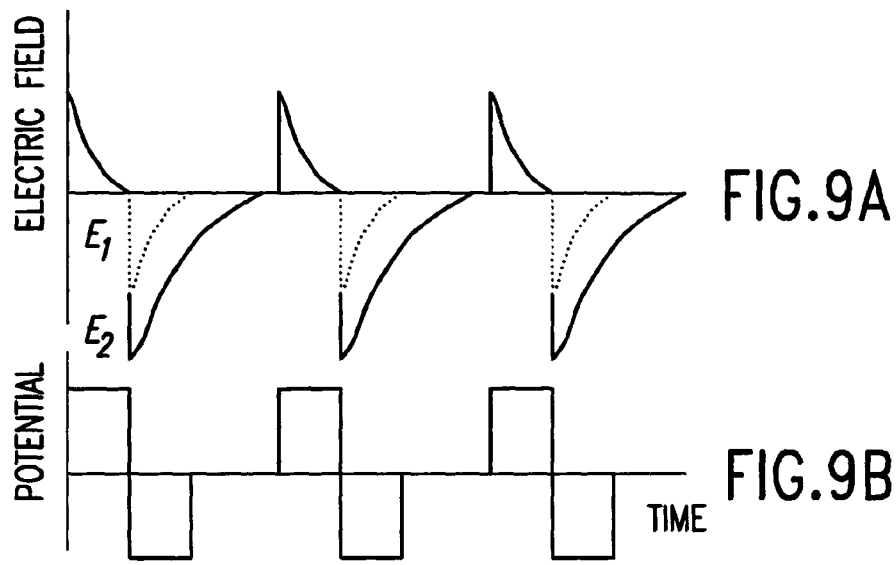
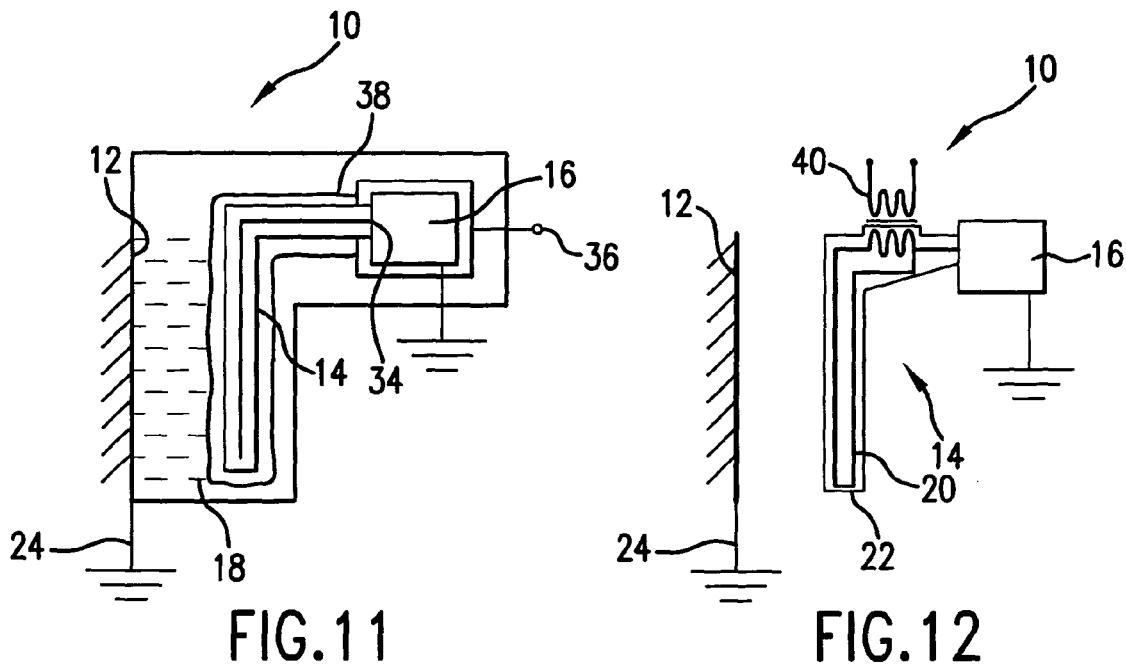

ELECTROHYDRODYNAMICALLY (EHD) ENHANCED HEAT TRANSFER SYSTEM AND METHOD WITH AN ENCAPSULATED ELECTRODE

REFERENCE TO RELATED APPLICATION

The current Utility Patent Application is based on Provisional Patent Application #60/372,756, filed Apr. 15, 2002.

FIELD OF THE INVENTION

The present invention relates to heat and mass transport, and particularly, to electrohydrodynamic (EHD) enhancement of heat and mass transfer.

More specifically, the present invention relates to an EHD enhanced heat and mass transfer technique in which an electrode which couples an electric field to the heat transfer fluid is completely encapsulated in electrically insulating material in order to prevent current leakage and short circuiting between a heat transfer surface and the electrode while enhancing the EHD heat transfer and reducing power consumption for EHD effects, preventing electrochemical corrosion of electrodes, and generating a double electrical field across the working media for sufficient time period while maintaining the electrode at substantially the same potential.

In addition, the present invention relates to a technique for application of EHD principles to electrically conductive heat and mass transfer media.

BACKGROUND OF THE INVENTION

There is a great need for high performance heat exchangers which increase the efficiency of utilization of waste heat in low temperature heat recovery applications as well as in low temperature power and refrigeration cycles. In addition to the efficiency gains by modification of heat exchangers by using enhanced surfaces, such as attached/integral fins, porous coatings, reentrant cavities and internal groovings, electrohydrodynamic (EHD) techniques have been developed which operates by applying a high voltage electrostatic potential field across a heat transfer fluid, which in one case may be a refrigerant or refrigerant mixture.

Active heat transfer enhancement techniques utilizing electric fields have been the subject of active research in recent years. Research has successfully demonstrated that application of electric fields to heat transfer surfaces and heat transfer media dramatically enhances the heat exchange processes and increases the efficacy of heat transfer systems. The phenomena of heat transfer enhancement has been studied and explained from the viewpoint of electrohydrodynamics (EHD), which relates to the interactions among electric fields, heat transfer media and its flow fields, and temperature fields. The applied electric field serves to increase mixing within the bulk flow and in particular within the fluid boundary layer, resulting in substantial increase of the heat and mass transport coefficients at the heat transfer surface. The resulting enhanced heat/mass transfer coefficients are often an order of magnitude higher than those achievable by conventional enhancement techniques.

For example, in Akira Yabe, et al., "Active Heat Transfer Enhancement by Utilizing Electric Fields", Annual Review of Heat Transfer, Begell House, Vol. 7, 1996, pp 193–244, the active local EHD generation of turbulence was fundamentally described. In this Publication, the EHD effects on condensation and boiling were chosen as the representative interfacial EHD phenomena and these mechanisms were explained both theoretically and experimentally. In Ohadi, et al., "Electrode Design, Fabrication, and Materials Science for EHD-Enhanced Heat and Mass Transport", Annual Review of Heat Transfer, Begell House, Vol. 11, pp. 563–623, the various design of electrode for enhancement of various single phase and phase change heat and mass transfer are described.

The electrohydrodynamic EHD technique is a promising technique which has proven potential for liquid pumping in the absence of any moving mechanical parts. Utilizing the effect of a phenomenon known as liquid extraction, the EHD technique can also effectively sustain the liquid pumping on a micro level, for example, in micro-electric mechanical systems (MEMS). Additionally, EHD has been demonstrated to show significantly enhanced heat transfer. Thus, the EHD technique can be used to enhance liquid pumping capabilities and simultaneously improve the cooling rates due to substantially higher heat transfer coefficients. The combination of these two capabilities make the use of the EHD a viable emerging technology for high performance heat exchanger device, including electronic cooling applications. Due to its lack of moving parts, this technology is highly reliable and is substantially maintenance free. Low cost and low power consumption are additional benefits of the EHD technique. Its applicability to heat transfer enhancement of industrially significant substances such as air, refrigerants, and certain aviation fuels has been previously demonstrated.

Unlike other techniques, the EHD technique provides on-line/on-demand, variable capacity control for heat exchange devices. Commercialization of this technique for selected applications in the near future is highly promising.

Moreover, EHD has significant potential in the control and enhancement of mass transfer, melting/solidification, and crystal growth. A very important area of EHD application is frost minimization. The EHD effects on frosting and defrosting phenomena were explained in Yabe, et al., and Ohadi, et al., supra. It is known that frost formation in a beat exchanger seriously affects the performance of the thermal system. This is an especially important problem in super market and food preservation refrigeration, food transportation refrigeration, as well as when applying heat pump systems to colder regions. The existing pre-EHD defrosting techniques use additionally imposed resistive heating to melt the frost on the heat transfer surface. To shorten the time required for melting and to minimize the additional energy required, a number of techniques have been researched and optimized from the engineering point of view. From the microscopic viewpoint, an important key issue is the removal of the dendritic crystals of ice from the heat transfer surface. Mostly Coulomb forces generated by an imposing electric field on the ice dipoles and accumulated charges at the interface between the heat transfer surface and the working media has the potential to remove the dendritic ice crystals. Frost formation has been shown to decrease more than 30% by application of the electrical field. The viability of completely eliminating frost formation by using the EHD technique is currently being studied.

Most of the EHD effects employ the electrical body force, which consists of three components: Coulomb forces, electrostrictive and electrophoretic forces. The Coulomb force is mostly related to electrical charges and dipoles. Other forces are related to the non-uniformity of the electrical fields or variation in fluid properties due to impurities, temperature gradients or other effects. Different parts of the body force contribute differently to the enhancement of different heat and mass transfer processes. This contribution depends on the working fluid's properties and the geometry of electrodes. For example, single phase gas heat transfer augmentation may be achieved mostly by dipole and ion movement as a result of the applied electrical field current. With two phase flow, the major contribution to the process can be attributed to the fluid properties or electrical field non-uniformity where the contribution of electrical current is small.

The EHD technique owes its particular application for enhancing heat transfer processes to different heat transfer mechanisms. For example, as described in U.S. Pat. No. 4,401,148, the efficiency of condensation heat transfer was notably augmented by opposing at least one electrode across a prescribed space to the heat transfer surface and applying a high electric potential capable of producing a non-uniform electric field. This enabled the condensate liquid formed on the heat transfer surface to be attracted by virtue of the electric field to the electrode, formed into a liquid column and removed from the heat transfer surface.

Further, in U.S. Pat. No. 4,396,055, a pumped heat pipe is electrohydrodynamically shown to be improved by means of application of a traveling potential wave thereto, thus inducing a traveling wave of electrical charge in the liquid phase of a dielectric working fluid which provides an electrical attraction which pumps the working fluid from a condensing section to an evaporating section of the electrohydrodynamic inductively pumped heat pipe.

U.S. Pat. No. 4,056,142 describes a heat exchange arrangement for use with chemically aggressive fluids wherein applying the principles of EHD to such a heat exchange arrangement decreases the effect of chemically aggressive fluids.

U.S. Pat. No. 4,207,942 discloses a plate heat exchanger which uses an anodic protection for the purposes of corrosion protection of plate heat exchangers formed particularly of stainless steel or titanium. In the arrangement of the plate heat exchanger comprising a pack of gasketed metal plates having aligned apertures to form supply and discharge ports for the heat exchange media, there is provided at least one electrode mounted in a manner to be insulated from the metal of the plates and extending along one of the ports formed by the aligned apertures.

EHD principles have also found utility in augmentation of boiling heat transfer, as described in U.S. Pat. No. 4,471,833 wherein the electric field is applied to a heat exchange medium so that the relaxation time of an electric charge of a heat exchange medium is made equal to or smaller than the characteristic time with respect to motion of bubbles generated by the heat transfer surface in the heat exchange medium which optimizes the maximum boiling heat flux.

U.S. Pat. No. 4,072,780 is directed to a method and apparatus for augmentation of convection heat transfer in liquid. In this arrangement, the electrodes are separated by spaces through which a liquid flows into/out of the heat transfer apparatus. A high voltage direct current is applied to the electrodes to produce turbulent components in the flow of the liquid to augment heat transfer between the liquid and the heat transfer surface.

One of the serious problems of the heat exchangers used in commercial and industrial refrigeration systems is directed to frost forming on the heat exchanger surface whenever the surface temperature is below the freezing point of water. The formation of frost in heat exchangers has been and continues to be a serious and vexing problem. The effects of the problems created by frost formation are typified by the general trends observed during the course of test runs conducted at a fixed mass flow rate of air, where it was found that there was a decrease in heat transfer rate with frost formation. The frost formation negatively affects the heat transfer of the heat transfer system due to frost-induced additional heat transfer resistance at the surface and the reduction in free flow area between the working media and heat exchange surface.

Among other techniques to reduce frost formation in the refrigeration type heat exchangers, the utilization of electrostatics is most promising to control the direction of droplets comprising a liquid fluid stream, which is the cause of the frost formation such as dendritic, crystalline, or ice-like structures on the heat exchange surfaces.

In U.S. Pat. No. 3,681,896, the control of frost formation in heat exchangers is carried out by applying an electrostatic charge to the air stream and to water introduced into the stream. The charged water droplets induce coalescence of the water vapor in the air. An electrical potential is applied to repel the charged fluid and in the next region, the surface is at a potential to attract the charged vapor thereby permitting the air stream to pass to the heat exchanger vapor free, thus substantially preventing frost formation on the heat exchange surface.

In the apparatus for electrohydrodynamic augmentation of heat transfer, described in U.S. Pat. No. 5,769,155, a heat exchange surface is provided with fins forming a space therebetween at which a working fluid flows with a flow velocity sufficient to form a thermal boundary layer in the vicinity of the heat transfer surface. The electrode wire is located in the space formed between the fins of the heat exchange surface. The electrode is coupled to a controllable source of high voltage, while the heat exchange surface may be electrically conductive and act as a ground. Insulators formed as spherical beads, each having a central opening sized for receiving the electrode wire therethrough, are spaced apart longitudinally along the electrode wire. The insulators are spaced along the electrode wire at a predetermined distance and have a diameter sufficient to distance the electrode wire from the heat exchange surface and the surface of the fins referred to as a minimum stand off distance.

Under normal operation conditions, the working fluid in contact with the walls of the fins forms a disruptible layer adjacent to the heat exchange surface. The voltage source produces an electrical field around the electrode wire. The electrical field is highly non-uniform due to the angled shape of the spacing between the fins. The non-uniform field thereby disrupts the disruptible layer adjacent to the heat exchange surface, thereby enhancing the heat exchange between the heat exchange surface and the working fluid.

Despite using the electrohydrodynamic enhancement of the heat transfer, the apparatus described in '155 patent, as well as the other EHD enhanced systems suffer from several drawbacks. Notably, the electrode wire is only partially insulated from the working fluid and has a conductive surface submerged in the working fluid. Such an arrangement may cause short circuiting between the electrode and the heat exchange surface if the heat transfer media is too conductive or if there are conductive impurities in the media which may be deposited between the electrode wire and the heat exchange surface (which is grounded for EHD purposes).

The conductive impurities may include metal particles from the welding which is often the case in industrial units. Such metal particles develop between the electrode wire and the heat exchange surface and can short-circuit the system. Another drawback is the possible current leakage, as well as ion recombination on the electrode wire, resulting in higher power consumptions for the EHD effect. Additionally, electrochemical corrosion of electrodes may lead to premature breakdown of the electrodes and working media.

Disadvantageously to all above described EHD applications, these techniques use bare electrodes adjacent to the heat exchanging surface. The bare electrodes are covered with condensed water, which is a good conductor, and as a result, these systems suffer high leakage currents, surface discharge and sparking, that substantially increases high voltage power consumption which may be up to 2 or 3 orders of magnitudes.

As a result, the achieved electrical field strength is low and the influence of the electrical field for augmentation of heat transfer processes is insufficient. For effective heat transfer in EHD-enhanced heat transfer systems, it is important to provide a high voltage electric field between the electrodes of the system across the working media, as presented in J. T. Bartlett, et al. "The Growth of Ice Crystal in an Electric Field", Zeltschrift fur Angehandte Mathematik und Physik, Vol. 14, Pages 599–610, 1963, and Akira Yabe, et al. "Active Heat Transfer Enhancement by Utilizing Electric Fields", Annual Review of Heat Transfer, Vol. 7, 1996, Pages 193–244. In both Publications, it has been shown that the effect of EHD technique is highly dependent on supporting a sufficient level of the electric field which in most cases is not possible with the bare electrode of the previously described EHD system. It would be therefore highly desirable to have an EHD heat and mass transfer technique free of the disadvantages of the prior art.

SUMMARY OF THE INVENTION

It is therefore an object of the present invention to provide an EHD-enhanced heat transfer technique free of short circuiting, capable of a high efficiency by using a strong electrical field without damaging of electrodes and breaking the fluid media, as well as having low leakage currents and therefore low power consumptions with an extended life of the electrodes and working fluids.

It is another object of the present invention to provide an EHD-enhanced heat transfer technique wherein the electrode is fully encapsulated within an insulating material.

It is also an object of the present invention to provide an electrohydrodynamic enhanced heat transfer technique for frost reduction, boiling and condensation, as well as liquid pumping wherein the high voltage power source, as well as the electrode, are both encapsulated in electrically insulated material as a whole.

A further objective of the present invention is to provide an EHD system using a flammable working media in which the high voltage power supply as well as the electrode are both encapsulated in the insulating material and are submerged into the working media.

Another objective of the present invention is to provide the EHD heat transfer system which is particularly applicable to the case of frost reduction where there is an application of heat to the electrode resulting in a temperature which is a few degrees higher than the dew point temperature to prevent water condensation.

It is still an object of the present invention to provide an EHD-enhanced heat transfer technique wherein a fully encapsulated electrode is supplied with pulse voltage of single polarity (in ON/OFF mode of operation), or of opposite polarities in bi-directional mode of operation wherein the duration of pulse and time between pulses depends on electrode geometry and properties of the working fluid.

It is still another object of the present invention to provide an EHD heat and mass transfer system which is equipped with electrical field (or electric current) sensors and feedback control for determining zero electric field between the electrode and grounded heat transfer surface to switch the pulse applied to the electrode.

According to the teachings thereof, the present invention is an electrohydrodynamic EHD heat transfer system which comprises an electrode completely encapsulated in an insulating material, a working media in contiguous contact with the heat transfer surface and a power supply energizing the encapsulated electrode in a predetermined manner for generating the electric field between the heat transfer surface and the encapsulated electrode for interacting with the heat exchange surface and the working media in order to enhance heat and mass transport therebetween. The power supply energizes the encapsulated electrode either by uni-directional pulses, or by bi-directional pulses applied to the electrode intermittently.

Preferably, in order to increase the efficacy of the heat transfer, the EHD heat transfer system includes a feedback control unit which is positioned between the heat exchange surface and the encapsulated electrode and is coupled to the power supply. The feedback control unit includes a sensor for determining when the electric field between the heat exchange surface and the encapsulated electrode approaches zero and cyclically switches the power supply either to change the polarity of the pulse supplied to the encapsulated electrode (in the case of bi-directional pulses mode of operation), or controls the power supply to generate single polarity pulses.

Such a feedback control unit may include a current sensor coupled to the ground electrode of the heat transfer surface, or alternatively, electrical field sensor positioned between the heat transfer surface and the encapsulated electrode.

In addition to encapsulating the electrode, the entire high voltage source may be encapsulated to prevent the leakage from the power supply. This is particularly useful in application of the EHD technique using flammable working fluids. Such also overcomes possible water and short circuiting condensation between electrodes and inside a power source in frost reduction applications of the EHD technique.

If the working fluid of the EHD heat or mass transfer system of the present invention is flammable, all electrical connections in such system have to be sealed and the voltage lowered as much as possible. For this application, the system of the present invention takes advantage of the location of the encapsulated high voltage power source inside the system (immersed into the working media) and use of low voltage power input external from the system (sealed from the working media).

When the encapsulated electrode is in contact with electrically conductive working fluids, electric charges accumulate on the surface of the insulation and may suppress the generated electric field. Additionally, the accumulation of condensed water on the surface of the encapsulated electrode is possible in the system adapted for air applications including frost reduction. Similar to the accumulation of the electrical charges on the surface of the insulation, the accumulation of the condensed water on the encapsulated electrode surface may completely block the electric field between the heat transfer surface and the encapsulated electrode. In order to prevent such an accumulation, in the system of the present invention, the encapsulated electrode is coated either with a water repellant composition, or heated to a few degrees higher than the dew point temperature to prevent water condensation on the surface of the encapsulated electrode, which decreases or completely eliminates collection of surface charge on the insulation which otherwise would decrease the electrical field between the heat exchange surface and the encapsulated electrode.

The present invention also depicts a method for electrohydrodynamic (EHD) enhanced heat transfer which includes the steps of:
- coupling an electrode at one end to a power supply,
- encapsulating the electrode in an insulating material substantially completely covering the electrode up to the power supply,
- providing a working media in contact with the heat transfer surface, and
- energizing the encapsulated electrode by power supply pulses to generate an electric field between the heat transfer surface and the encapsulated electrode for interacting with the heat transfer surface and the working media to enhance heat transfer there between.

The encapsulated electrode can be energized either by pulses of a single polarity in on/off mode of operation, or by bi-directional pulses intermittently.

The method may further include the steps of insulating the high voltage supply and the electrode as a whole in the insulating material and immersing the whole encapsulated structure power supply/electrode into the working media. A low voltage input of the power supply is left outside of the system.

In order to prevent accumulation of unwanted charge on the surface of the encapsulated electrode due to fluid condensation, the encapsulated electrode either is covered with a water or other repellant working fluids or is heated several degrees above the dew point temperature of the air in the EHD system.

These and other novel features and advantages of this invention will be fully understood from the following detailed description of the accompanying Drawings.

BRIEF DESCRIPTION OF THE DRAWINGS

FIG. 2 illustrates schematically the initial position of charges and ions within the working media when a positive pulse is applied to the electrode;

FIG. 3 illustrates schematically the ion deposition on the insulation of the encapsulated electrode with a pulse applied to the encapsulated electrode;

FIG. 4 details the change of the electric field in the gap between the heat transfer surface and the encapsulated electrode vs. time;

FIG. 5 shows the charge distribution and ion movement after potential on the encapsulated electrode is turned OFF;

FIGS. 6A and 6B explain the change of the electrical field in the gap between the heat transfer surface and the encapsulated electrode (FIG. 6A) and of the potential applied to the encapsulated electrode (FIG. 6B) vs. time when the power supply energizes the encapsulated electrode in ON/OFF mode of operation with the uni-polar pulses;

FIG. 7 is a schematic representation of charge distribution and ion movement in the working media after potential on the encapsulated electrode is changed to the opposite sign;

FIGS. 8A and 8B are diagrams showing respectively the electric field (FIG. 8A) and potential on the encapsulated electrode (FIG. 8B) vs. time when the power supply applies intermittently the bi-directional pulses to the encapsulated electrode;

FIGS. 9A and 9B are diagrams showing respectively the electric field (FIG. 9A) and potential (FIG. 9B) vs. time when the power supply provides bi-directional pulses to the encapsulated electrode;

FIG. 11 shows schematically the encapsulated electrode and the encapsulated power supply internal the EHD system of the present invention immersed into the working fluid;

FIG. 12 shows schematically electrical heating of the encapsulated electrode;

DETAILED DESCRIPTION OF THE PREFERRED EMBODIMENTS

Figure 1:
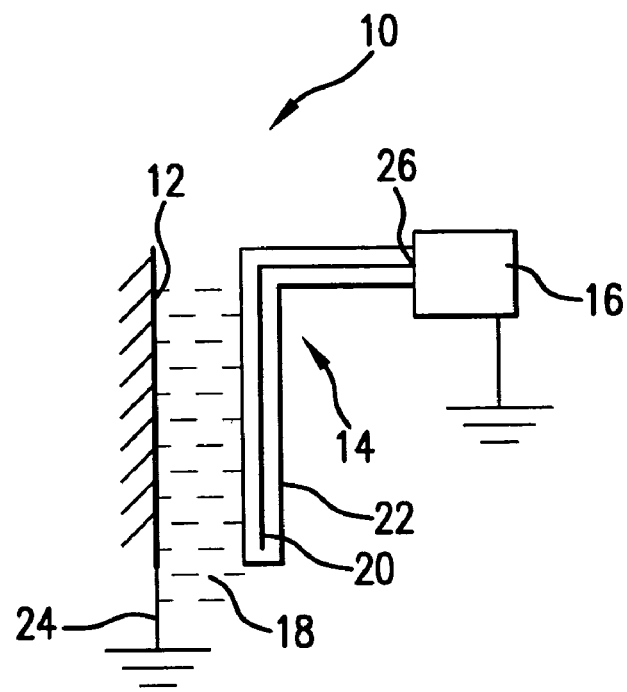
FIG. 1 is a schematic representation of the electrohydrodynamic heat transfer system of the present invention showing an encapsulated electrode.

Referring to FIG. 1, a heat transfer system 10 enhanced by an electrohydrodynamic arrangement, includes a heat transfer surface 12; an encapsulated electrode 14, a high voltage power supply 16, and a dielectric working media 18 in contact with the heat transfer surface 12 and the encapsulated electrode 14. The encapsulated electrode 14 includes an electrode wire 20 (or an electrode plate, not shown in the Drawings) and an insulation layer 22 completely encapsulating the electrode wire 20 up to the high voltage power supply 16. The insulation layer may be formed of Teflon, Kapton, or any other insulating material including surface oxidation compounds.

The heat transfer surface 12 is coupled to the ground via the ground electrode 24. The high voltage power supply 16 coupled to the end 26 of the encapsulated electrode 14, energizes the encapsulated electrode 14 by either uni-polar or bi-directional pulses of energy. The encapsulated electrode 14 generates a high voltage electrostatic field across the working media 18 which is a heat transfer fluid, such as a refrigerant or refrigerant mixture or a gas or a gas mixture. The applied electric field 28 between the grounded heat transfer surface 12 and the encapsulated electrode 14 serves to destabilize the thermal boundary layer (the layer created on the boundary between the heat transfer surface and the working media), thus increasing boiling or condensation of the fluid 18 near the heat transfer surface 12, and producing optimized mixing of the bulk fluid flow. The net effect of such an application of the electrical field between the heat transfer surface and the encapsulated electrode is an increased heat or mass transfer coefficient of the heat transfer system 10.

After the positive pulse is applied to the electrode wire 20 of the encapsulated electrode 14 from the high voltage power supply 16, the negative ions 30 move to the encapsulated electrode 14, while the positively charged ions 32 move towards the heat transfer surface, as shown in FIG. 2. During the entire time the positive pulse applied to the electrode 20, the current of the negative ions 30 towards the encapsulated electrode 14 and of negative ions 32 towards the heat transfer surface 12 continues. A negative ion deposition on the surface of the insulation layer 22 of the encapsulated electrode 14 takes place, as shown in FIG. 3.

The negative ions deposited on the surface of the encapsulated electrode are prevented from recombination with the positively charged electrode wire 20 by the insulation layer 22. Since the negative charge is collected and growing on the surface of the insulation layer 22, the current of negative ions 30 and positive ions 32 between the heat transfer surface 12 and the encapsulated electrode 14 slows down due to a decrease in the potential difference between the encapsulated electrode 14 and the heat transfer surface 12. As a result of a decrease in the potential difference between the encapsulated electrode 14 and the heat transfer surface 12, the electric field 28 between the encapsulated electrode 14 and the heat transfer surface 12 drops with the time, as shown in FIG. 4.

When the electric field 28 approaches zero, the application of the positive pulse to the electrode wire 20 ceases, as shown in FIG. 5, and the current of positive and negative ions within the working media between the heat transfer surface 12 and the encapsulated electrode 14 reverses direction. Specifically, when the potential on the electrode 20 is zero, the negatively charged surface of the insulation layer 22 attracts the positive ions 32 thereto, while the grounded heat transfer surface 12 attracts negative ions 30. The first instant of the ceasing of the application of the positive pulse to the electrode wire 20, the negatively charged encapsulated electrode 14 and the positively charged heat transfer surface 12 create the electric field of a magnitude $E_1$, however, in an opposite direction than the electric field created when the positive pulse was applied to the electrode wire 20. In this electrical field, as shown in FIG. 5 and FIG. 6A, the positive ions 32 are attracted to the encapsulated electrode 14 negatively charged with the deposition of the negative ions. The negative ions 30 are moving towards the heat transfer surface 12 which in this case is grounded and accommodates potential of the electrode. The positive ions 32 recombine with the negative charge on the surface of the insulation layer 22, and the negative ions 30 recombine with the positively charged heat transfer surface 12, so that the electric field between the encapsulated electrode 14 and the heat transfer surface 12 is gradually decreased in the $2^{nd}$ period of the single polarity pulse mode cycle, as shown in FIG. 6A in the absence of the potential on the electrode wire 20, shown in FIG. 6B.

Turning now to FIG. 7, if during the $2^{nd}$ period of the operation of the EHD system, the electrode 20 is supplied with a negative pulse (e.g., of the opposite polarity to the pulse applied to the electrode wire 20 in the $1^{st}$ period) shown in FIGS. 8A and 8B, the negative pulse applied to the electrode wire 20 along with the negatively charged surface of the insulation layer 22 of the encapsulated electrode 14 (at the end of the $1^{st}$ period) will provide for larger difference of potential between the encapsulated electrode 14 and the heat transfer surface.

The application of a negative pulse to the electrode 14 creates a stronger electrical field, which will be of a magnitude equal to the sum of the E1 and E2 (whereas E1 corresponds to the electric field created when no pulse is applied to the electrode wire 20, and E2 is the magnitude of an electric field corresponding to the amplitude of the negative pulse applied to the electrode wire 20 in the $2^{nd}$ period), as shown in FIG. 8A. The strong electric field created in the beginning of the $2^{nd}$ period in the gap between the heat transfer surface 12 and the encapsulated electrode 14, generates an intensified motion of the charges in the working media.

Specifically, the positive ions 32 attracted by the negatively charged surface of the insulation layers 22, as well as negatively charged electrode 20, will move or displace towards the encapsulated electrode 14 and recombine with the negative charge on the surface of the insulation layer 22, while the negative ion 30 will move towards the heat transfer surface 12 and recombine thereon as well. Therefore, the electric field decreases from the magnitude of E1+E2 to zero with the time, as shown in FIGS. 8A and 8B.

Figure 10:
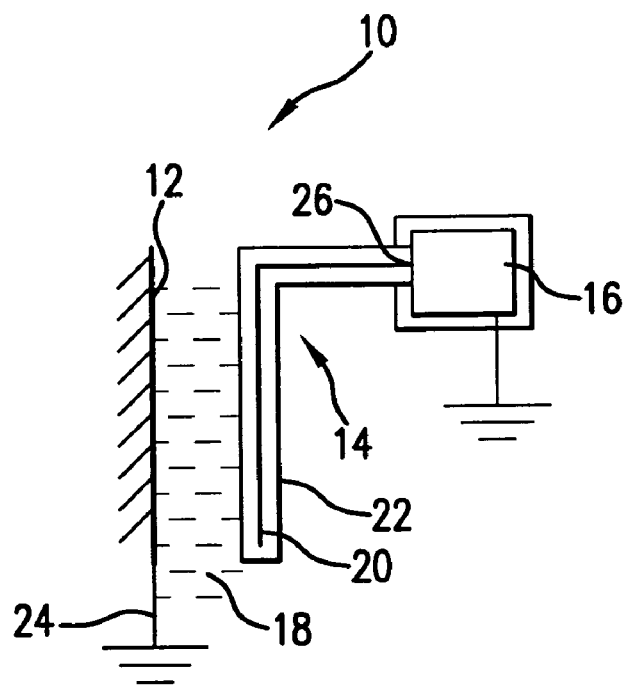
FIG. 10 illustrates schematically a system of the present invention with the electrode and high voltage power supply encapsulated.

The diagrams shown in FIGS. 9A and 9B illustrate the electric field (FIG. 9A) and potential applied to the electrode wire 20 of the encapsulated electrode 14 (FIG. 9B) in a bi-directional mode of operation. As shown, during the positive pulses application to the electrode 20, the electric field is positive and has the magnitude of E1, while during the application of negative pulses to the electrode wire 20 of the encapsulated electrode 14, the electric field created between the encapsulated electrode 14 and the heat transfer surface 12 is negative and initially has a high magnitude which equals E1+E2. This mode of operation, when bi-directional pulses are intermittently applied to the encapsulated electrode 14 is preferred since a double electric field can be generated by application of the pulse of the same amplitude (but of the opposite polarity), which is desirable for EHD systems. It significantly decreases the cost of high voltage power supply and electrode insulation 22 requirement There are situations when the entire high voltage power supply 16 should be encapsulated as well as the encapsulated electrode, as shown in FIG. 10. For example, in space systems, preventing the leakage of high voltage charges is a problem area which is solved in the system 10 of the present invention by encapsulating the high voltage power supply 16 as well as the electrode 20 into the layer of insulation material as a whole. In addition, encapsulating the power supply and the electrode wire as a whole permits safe application of EHD enhancement to a flammable working fluid. Even for frost reduction applications, it is preferably in the system of the present invention to encapsulate the high voltage power supply 16 to prevent condensed water accumulation and the possibility of short circuiting.

If a working fluid 18 of the EHD enhanced heat transfer system 10 of the present invention is flammable, external connections of high voltage power source 16 brings a danger of ignition of the working fluid vapor in case of an electrical spark. All electrical connections of such a system have to be sealed and voltage applied to the electrode wire 20 should be lowered as much as possible. The atmosphere inside system 10 usually does not include oxygen, therefore, the danger of ignition from the spark inside the system is much lower. For this application, the best solution found in the system of the present invention is location of the encapsulated high voltage power source 16 inside the system 10, i.e., immersed into the working fluid. The high voltage output 34 of the high voltage power supply 16 and the end 26 of the encapsulated electrode 14 are completely sealed from the environment, and the low voltage power input 36 of the high voltage power supply 16 is to be used outside of the system 10, as shown in FIG. 11.

When the encapsulated electrode 14 is immersed in electrically conductive working fluid 18, or in the case when the product of the working fluid is conductive, electric charges accumulate on the surface of the insulation layer 22, thus suppressing the electric field generated between the heat transfer surface 12 and the encapsulated electrode 14 through the working fluid 18.

Additionally, accumulation of condensed water on the encapsulated electrode surface, can contribute to accumulation of electric charges thereon, thus completely blocking the electric field. Therefore, as shown in FIG. 11, the system 10 of the present invention is prevented from such an accumulation by coating a layer of water repellent 38 on the insulating layer 22 of the encapsulated electrode 14. Alternatively, the encapsulated electrode 14 can be heated to a few degrees higher than the dew point temperature of the surrounding air to prevent water condensation.

Figure 13:
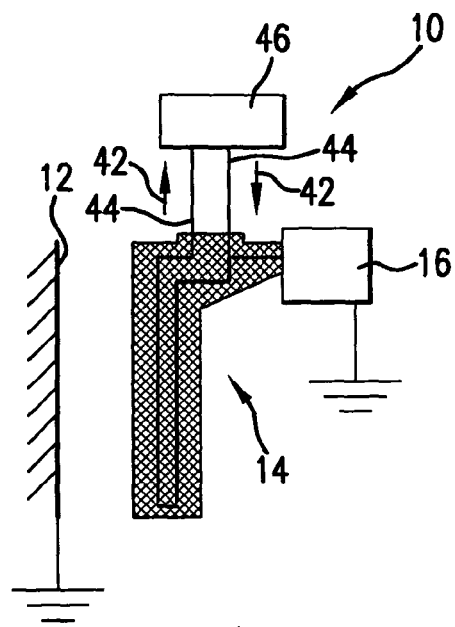
FIG. 13 shows schematically a fluid heating of the encapsulated electrode of the present invention.

FIG. 12 illustrates the design of the encapsulated electrically heated electrode 14. As shown, the heating energy is supplied through a transformer 40, one side of which can sustain high voltage. In this manner, the electrode 20 is heated and simultaneously the insulation layer 22 of the encapsulated electrode 14 is heated. Alternatively, as shown in FIG. 13, the heating of the encapsulated electrode 14 can be carried out by means of electrically non-conductive fluid 42 flowing through non-conductive tubes 44 extending between a fluid conditioning unit 46 and the electrode wire 20 within the encapsulated electrode 14.

For an effective functioning of the heat transfer EHD enhanced system 10 of the present invention it is important that energizing of the encapsulated electrode by single polarity pulses, shown in FIGS. 2–6B, or bi-directional pulses intermittently, as shown in FIGS. 7–9B, is in alignment at the time when the electrical field approaches zero either at the end of the first period or at the end of the second period of the energizing cycle.

Figure 14:
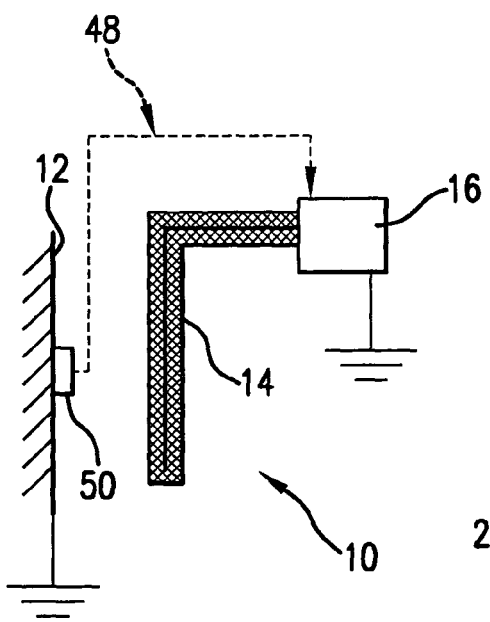
FIG. 14 shows the system of the present invention with electric field sensor.

For this purpose, the system 10 is provided with a feedback control unit 48. For example, as shown in FIG. 14, the feedback control unit 48 can include the electric field sensor 50 positioned between the heat transfer surface and the encapsulated electrode 14 for determining when the electric field across the working media approaches zero.

Figure 15:
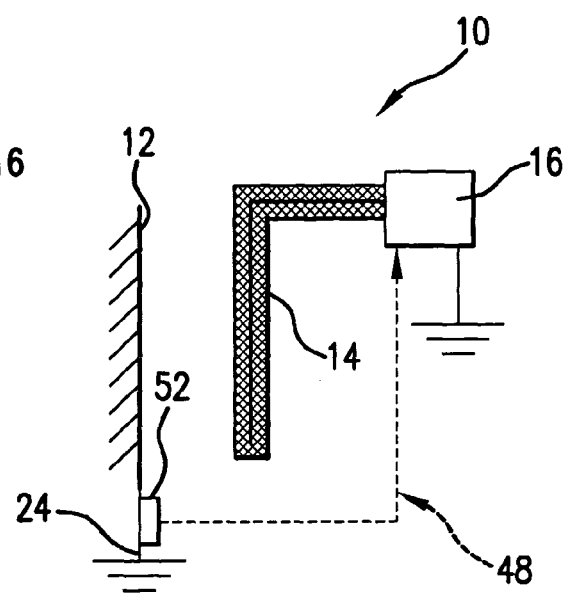
FIG. 15 shows the system of the present invention with electrode current sensor.

Alternatively, as shown in FIG. 15, the feedback control unit 48 can include a current sensor 52 coupled to the ground electrode 24 of the heat transfer surface 12. Because the ground electrode 24 accommodates any electric field change, the charge on the ground electrode will continuously change by absorbing or repelling electrons. This current through the ground electrode 24 can be measured by the current sensor 52 and used as a feedback control in the heat transfer system 10 of the present invention. Both arrangements of the feedback control unit 48, either including the electric field sensor 50 or the current sensor 52 are coupled to the high voltage power supply 16 to permit switching the pulse applied to the electrode 20 either in ON/OFF mode of operation or in the bi-directional mode of operation accordingly.

The feedback control unit may alternatively include a temperature sensor and/or a sensor for determining the efficiency of heat and mass transfer for ensuring working regimes of the EHD-enhanced system 10.

The duration of the pulses applied to the electrode 20 of the encapsulated electrode 14, as well as their period, depend on intensity of ion deposition on the insulation layer 22 and the capacitance of the encapsulated electrode 14. If the surface area of the encapsulated electrode is well-developed and the thickness of the insulation layer 22 is low, the capacitance of the encapsulated electrode is high. The insulated plate electrode (if used instead of the electrode 20) has a higher capacitance then the wire electrode. The required period of pulses increases with the increase of the capacitance of the encapsulated electrode. In the case with increased humidity of the air in the frost reduction applications and with the increased conductivity of the working fluid, the ion deposition on the surface of the insulation layer 22 is higher, and therefore, such system will require shorter periods (higher frequency) of pulses.

Experiments which have been conducted have shown that for the case of the wire electrode within the encapsulated electrode, 2–3 minutes of the pulse period provide satisfactory results. For the system of the present invention in low temperature applications, or where the plate electrode would be used as an encapsulated electrode, the period of pulses can be in tenths of minutes. For the frost wet conditions (about 0° C.), the period of the pulses can be in the order of a second or even shorter.

As described in previous paragraphs, the heat transfer EHD-enhanced system 10 of the present invention with the encapsulated electrode 14, can be used in frost free refrigerators, transport, supermarket, and industrial refrigeration systems, heat pumps, dehumidification units, ground and space environmental control systems;

for refrigeration and air conditioning, as well as in air side heat exchangers where application of EHD technique is limited to high EHD power consumption;

in oil processing and refining industries where application of EHD is limited due to safety requirements;

in space cooling and liquid pumping systems where a major concern is reliability and low power requirements;

in electronics cooling systems which have a low electromagnetic interference and low power requirement; and in water, refrigerants, or other fluid spraying in electrical fields.

All applications of the principles of the present invention, are possible due to the use of the encapsulated electrode, and/or encapsulated electrode and the encapsulated high voltage power supply, as opposed to the bare electrode of the typical EHD enhanced heat exchange systems. In the system of the present invention, due to the fact that an encapsulated electrode used, the electrical current is prevented from passing through the fluid working media and insulator surfaces. Further, the inference of the electrical field on the process is more efficient because a much stronger electrical field may be achieved without breaking the fluid working media. It has also been found that leakage currents and power consumption are much lower than conventional processes. For example, in processes like condensation and different liquids separation, the technique of the present invention drastically decreases power consumption. In other applications, such as the frost reduction by application of the electrical field, industrial application of EHD principles is not practicable without the encapsulated electrode of the present invention.

Therefore, summarizing the above said, the heat transfer EHD enhanced system of the present invention taking advantage of the encapsulated electrode, provides benefits in the following ways:

the system of the present invention prevents a short circuiting in the working media even if it is highly conductive or there are conductive impurities in the heat transfer fluid;

it reduces power consumption due to prevention of current leakage and elimination of ion recombination on the encapsulated electrode;

it prevents electrochemical corrosion of electrodes, which extends the life of electrodes and working fluids;

allows increased electrical potential and electrical field in the working media; and, generates double electrical field with the same potential applied to the encapsulated electrode.

Although the invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended claims.

What is claimed is:

1. An electrohydrodynamic (EHD) heat transfer system, including:
   a heat transfer surface;
   a power supply;
   at least one electrode substantially completely encapsulated in an insulating material and coupled to said power supply; and,
   a working media in contact with said heat transfer surface, said encapsulated electrode being disposed in spaced relationship with said heat transfer surface for generating an electric field between said beat transfer surface and said encapsulated electrode when energized by said power supply for interacting with said heat exchange surface and said working media to enhance heat transfer there between, said at least one electrode being completely electrically isolated from said working media by said insulating material.

2. The EHD heat transfer system of claim 1, wherein said heat transfer surface is coupled to a ground.

3. The EHD heat transfer system of claim 1, further comprising a layer of an insulation material substantially completely encapsulating said power supply.

4. The EHD heat transfer system of claim 1, wherein said electrode and said power supply are encapsulated as a whole in said insulating material.

5. The EHD heat transfer system of claim 4, wherein said encapsulated power supply is immersed into said working media, said power supply having a high voltage output coupled to said encapsulated electrode and a low voltage input isolated from said working media.

6. The EHD heat transfer system of claim 5, wherein said working media includes a flammable working fluid.

7. The EHD heat transfer system of claim 1, further comprising a water repellant coated on the surface of said encapsulated electrode.

8. The EHD heat transfer system of claim 1, further comprising heating means coupled to said encapsulated electrode.

9. The EHD heat transfer system of claim 8, wherein said heating means includes a transformer coupled to said encapsulated electrode.

10. The EHD heat transfer system of claim 8, wherein said heating means includes a fluid conditioning unit coupled to said encapsulated electrode through non-conductive tubes, and non-conductive fluid circulating through said non-conductive tubes.

11. An electrohydrodynamic (EHD) heat transfer system comprising:
    a heat transfer surface;
    a power supply;
    at least one electrode substantially completely encapsulated in an insulating material and coupled to said power supply;
    a working media in contact with said heat transfer surface, said encapsulated electrode being disposed in spaced relationship with said heat transfer surface for generating an electric field between said heat transfer surface and said encapsulated electrode when energized by said power supply for interacting with said heat exchange surface and said working media to enhance heat transfer there between; and
    feedback control means coupled to said power supply, said feedback control means for determining when said electric field between said heat transfer surface and said encapsulated electrode changes polarity.

12. The EHD heat transfer system of claim 11, further comprising a ground electrode of said beat transfer surface, and wherein said feedback control means includes a current sensor coupled to said ground electrode of said heat transfer surface.

13. The EHD heat transfer system of claim 11, wherein said feedback control means includes an electrical field sensor coupled to said heat transfer surface.

14. The EHD heat transfer system of claim 1, wherein said power supply energizes said encapsulated electrode with unidirectional pulses in ON/OFF mode.

15. The EHD heat transfer system of claim 1, wherein said power supply energizes said encapsulated electrode with bi-directional pulses intermittently.

16. A method for electrohydrodynamic (EHD) enhanced heat transfer, comprising the steps of:
    coupling an electrode at one end thereof to a power supply;
    providing a working media in contact with a heat transfer surface;
    completely electrically isolating said electrode from said working media by encapsulating said electrode in an insulating material substantially completely covering said electrode up to said power supply;
    disposing said encapsulated electrode in spaced relationship with said heat transfer surface; and
    energizing said encapsulated electrode by pulses output from said power supply to generate an electric field between said heat transfer surface and said encapsulated electrode for interacting with said heat transfer surface and said working media to enhance heat transfer therebetween.

17. The method of claim 16, further comprising the steps of:
    energizing said encapsulated electrode by said pulses of a single polarity in ON/OFF mode of operation.

18. The method of claim 16, further comprising the steps of:
    energizing said encapsulated electrode by bi-directional said pulses intermittently.

19. The method of claim 16, further comprising the step of:
    coupling said heat transfer surface to ground via a ground electrode.

20. The method of claim 1, further comprising the step of:
    encapsulating said power supply in an insulating material.

21. The method of claim 20, further comprising the step of:
    enveloping said power supply and said electrode as a whole in said insulating material.

22. The method of claim 20, wherein said power supply has a high voltage output coupled to said encapsulated electrode and a low voltage input, further comprising the steps of:
    immersing said encapsulated power supply in said working media, and
    isolating said low voltage input of said power supply from said working media.

23. The method of claim 16, further comprising the step of:
    coating a water repellant on the surface of said encapsulated electrode.

24. The method of claim 16, further comprising the step of:

heating said encapsulated electrode.

25. A method for electrohydrodynamic (EHD) enhanced heat transfer, comprising the steps of:

coupling an electrode at one end thereof to a power supply;

encapsulating said electrode in an insulating material substantially completely covering said electrode up to said power supply;

disposing said encapsulated electrode in spaced relationship with a heat transfer surface;

providing a working media in contact with said heat transfer surface;

energizing said encapsulated electrode by pulses output from said power supply to generate an electric field between said heat transfer surface and said encapsulated electrode for interacting with said heat transfer surface and said working media to enhance heat transfer therebetween;

sensing when said electric field between said heat transfer surface and said encapsulated electrode approaches zero; and controlling the output of said power supply according to a predetermined pattern.

* * * * *